(12) United States Patent
Cheng et al.

(10) Patent No.: US 9,085,250 B2
(45) Date of Patent: Jul. 21, 2015

(54) BASE FOR CHILD SAFETY CARRIER

(71) Applicants: Chin Ming Cheng, Taipei (TW); Zheng-Wen Guo, Central Hong Kong (HK)

(72) Inventors: Chin Ming Cheng, Taipei (TW); Zheng-Wen Guo, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 42 days.

(21) Appl. No.: 13/957,509

(22) Filed: Aug. 2, 2013

(65) Prior Publication Data

US 2014/0035333 A1 Feb. 6, 2014

(30) Foreign Application Priority Data

Aug. 3, 2012 (CN) .......................... 2012 1 0277311
Jul. 11, 2013 (CN) .......................... 2013 1 0290504

(51) Int. Cl.
*A47C 1/08* (2006.01)
*A47D 1/10* (2006.01)
*B60N 2/28* (2006.01)

(52) U.S. Cl.
CPC .................................. *B60N 2/2884* (2013.01)

(58) Field of Classification Search
CPC .............. B60N 2/28; B60N 2/00; B60N 2/01; B60N 2/2884; B60N 33/001
USPC ............... 297/216.11, 256.13, 322, 320, 329, 297/344.1, 256.16, 256.1
See application file for complete search history.

(56) References Cited

U.S. PATENT DOCUMENTS

| | | | |
|---|---|---|---|
| 4,911,449 A * | 3/1990 | Dickinson et al. .............. 463/20 |
| 5,380,062 A | 1/1995 | Nania | |
| 5,494,331 A | 2/1996 | Onishi et al. | |
| 8,556,344 B2 * | 10/2013 | Williams et al. ......... 297/256.13 |
| 8,567,862 B2 * | 10/2013 | Williams et al. ......... 297/188.13 |
| 8,870,285 B2 * | 10/2014 | Williams et al. ......... 297/256.13 |
| 8,882,196 B2 * | 11/2014 | Williams et al. ......... 297/256.16 |

\* cited by examiner

*Primary Examiner* — Chi Q Nguyen
(74) *Attorney, Agent, or Firm* — David I. Roche; Baker & McKenzie LLP

(57) ABSTRACT

A base suitable for use with a child safety carrier includes a shell body, a platform movably assembled with the shell body, a latch mechanism and a plurality of cushion structures. The latch mechanism includes a holding frame and a latch, the holding frame being affixed with one of the shell body and the platform, and the latch being assembled with the other one of the shell body and the platform. The holding frame includes locking openings, and the latch is operable to engage with any of the locking openings to lock the platform with the shell body. The cushion structures are respectively disposed adjacent to the locking openings. When collision occurs, the latch can interact with one of the cushion structures to cause deformation or break of the cushion structure so that the platform is displaced relative to the shell body.

26 Claims, 20 Drawing Sheets

BASE FOR CHILD SAFETY CARRIER

CROSS-REFERENCE TO RELATED APPLICATIONS

This application respectively claims priority to Chinese Patent Application No. 201310290504.7 filed on Jul. 11, 2013, and also to Chinese Patent Application No. 201210277311.3 filed on Aug. 3, 2012, incorporated herein by reference.

BACKGROUND

1. Field of the Invention

The present invention relates to bases for child safety carriers.

2. Description of the Related Art

A child safety seat is usually required to seat a young child in a vehicle for protecting the child during crash collision. The child safety seat usually includes a base that can be fastened with the vehicle, and a child seat that can be installed on the base. Moreover, the child seat typically includes a seat bottom, and a backrest affixed with the seat bottom.

To allow the placement of the child seat at a suitable recline position, some child safety seats may have a base structure that permits recline adjustment of the child seat. However, the adjustment mechanism provided in the base may not be always convenient to operate. Moreover, the locking state of the adjustment mechanism is usually designed to firmly hold the child seat in position relative to the base. As a result, the energy resulting from a crash collision may be substantially transmitted to the child seat and cause injury to the child sitting thereon.

Therefore, there is a need for an improved structure that can address at least the aforementioned issues.

SUMMARY

The present application describes a child safety carrier that has a movable platform assembled with the base, so as to allow convenient adjustment of the child seat installed thereon. The base also includes cushion structures that can absorb some of the energy generated during crash collision to reduce the risk of child's injury.

According to one embodiment, a base suitable for use with a child safety carrier includes a shell body, a platform movably assembled with the shell body, a latch mechanism and a plurality of cushion structures. The latch mechanism is assembled with the shell body and the platform, and includes a holding frame and a latch, the holding frame being affixed with one of the shell body and the platform, and the latch being assembled with the other one of the shell body and the platform. The holding frame includes a plurality of locking openings, and the latch is operable to engage with any of the locking openings to lock the platform with the shell body. The cushion structures are respectively disposed adjacent to the locking openings. When collision occurs, the latch can interact with one of the cushion structures to cause deformation or break of the cushion structure so that the platform is displaced relative to the shell body.

DETAILED DESCRIPTION OF THE EMBODIMENTS

Figure 1:
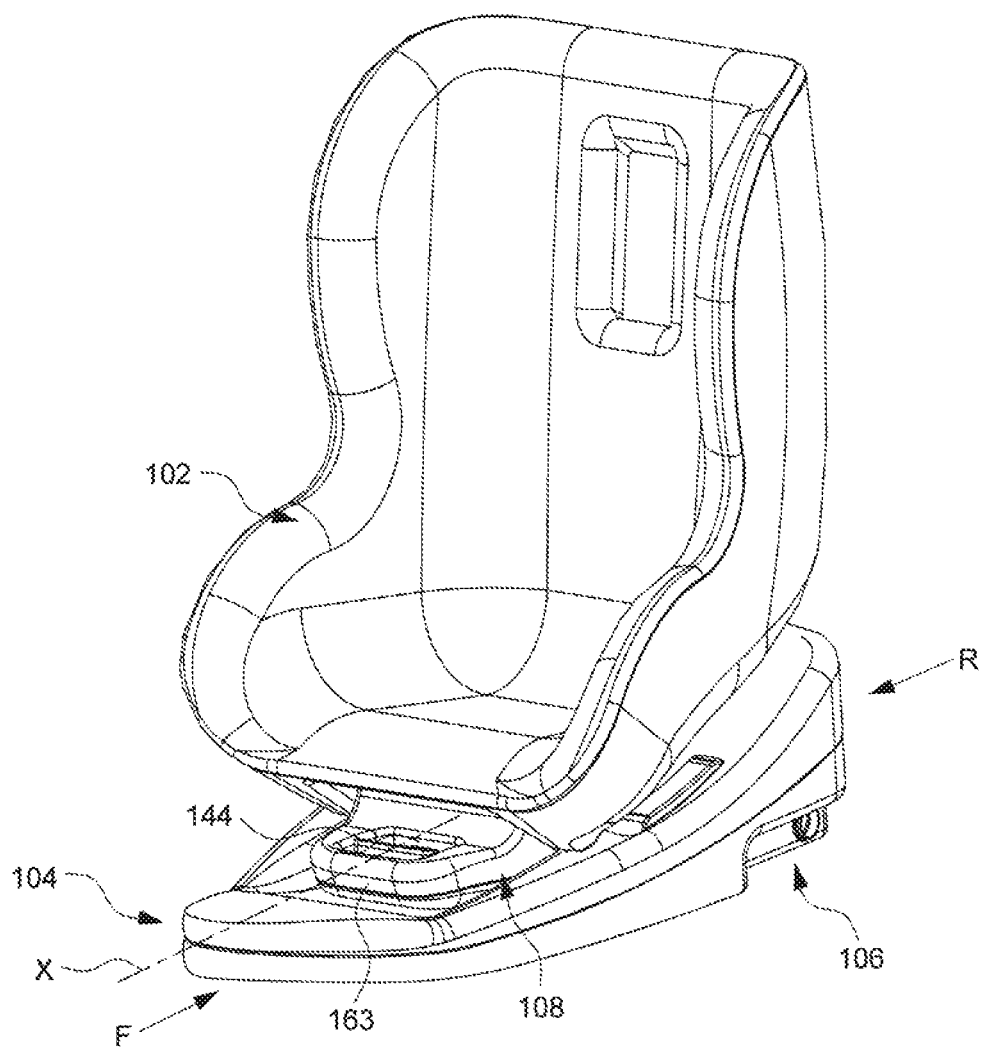
FIG. 1 is a perspective view illustrating an embodiment of a child safety carrier.

FIG. 1 is a perspective view illustrating an embodiment of a child safety seat 100. The child safety seat 100 can include a seat portion 102 and a base 104. The seat portion 102 can be fixedly attached with the base 104 for installation on a passenger's seat of a vehicle. The seat portion 102 can also be detached from the base 104 for facilitating its portability. The seat portion 102 may include a seat shell formed by plastic molding, and a soft fabric arranged over the seat shell for providing comfortable sitting.

The base 104 can have a lengthwise axis X that extends from a rear R to a front F of the base 104. The rear R of the base 104 can include a plurality of connectors 106. When the base 104 is installed on a passenger's seat of a vehicle, the connectors 106 can respectively attach with an anchorage structure of the vehicle to securely hold the base 104 in place.

The base 104 can include a movable platform 108 for facilitating the adjustment of the seat portion 102. Once the seat portion 102 is placed on the platform 108, the seat portion 102 and the platform 108 can fasten with each other. Should a caregiver want to adjust the position of the seat portion 102 relative to the base 104, the platform 108 can be unlocked, and the seat portion 102 and the platform 108 then can be moved forward or rearward in unison along the lengthwise axis X.

Figure 2:
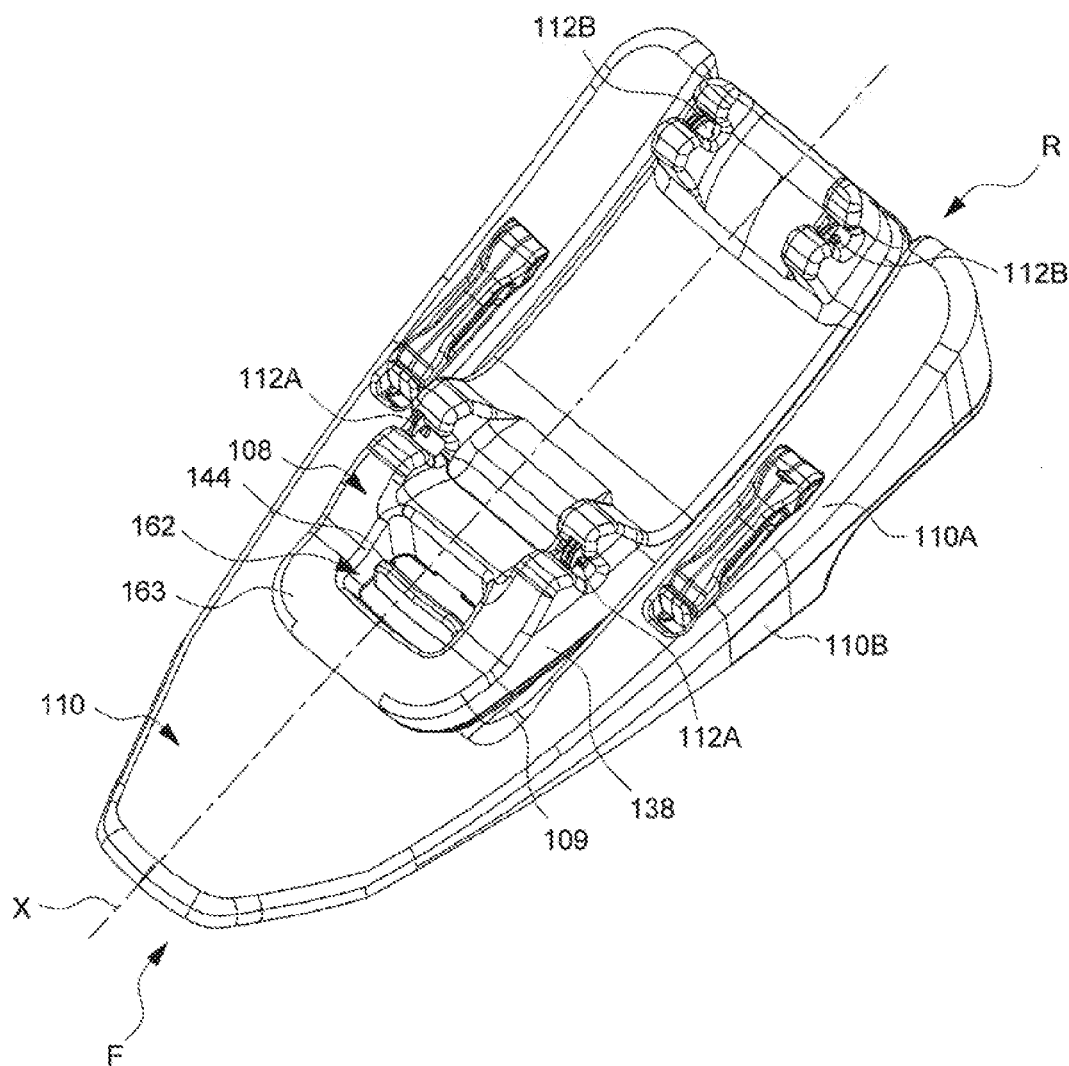
FIG. 2 is a perspective view illustrating a base of the child safety carrier.

FIG. 2 is a perspective view of the base 104. The base 104 can include a shell body 110 that can be formed by the assembly of an upper shell portion 110A and a lower shell portion 110B. The upper shell portion 110A can include an upper surface 109 having a curved shape, so that the rear R of the base 104 has a height greater than that of the front F of the base 104. The platform 108 can be assembled with the upper surface of the upper shell portion 110A for movement toward the front F and rear R of the base 104 to change an inclination of the seat portion 102 relative to the base 104.

The platform 108 can have a body 138 formed by plastic molding. An upper side of the platform 108 can include a plurality of fasteners 112A and 112B that can engage with the seat portion 102 to affix the seat portion 102 on the base 104. In one embodiment, the fasteners 112A and 112B can exemplary be hook members.

Figure 7:
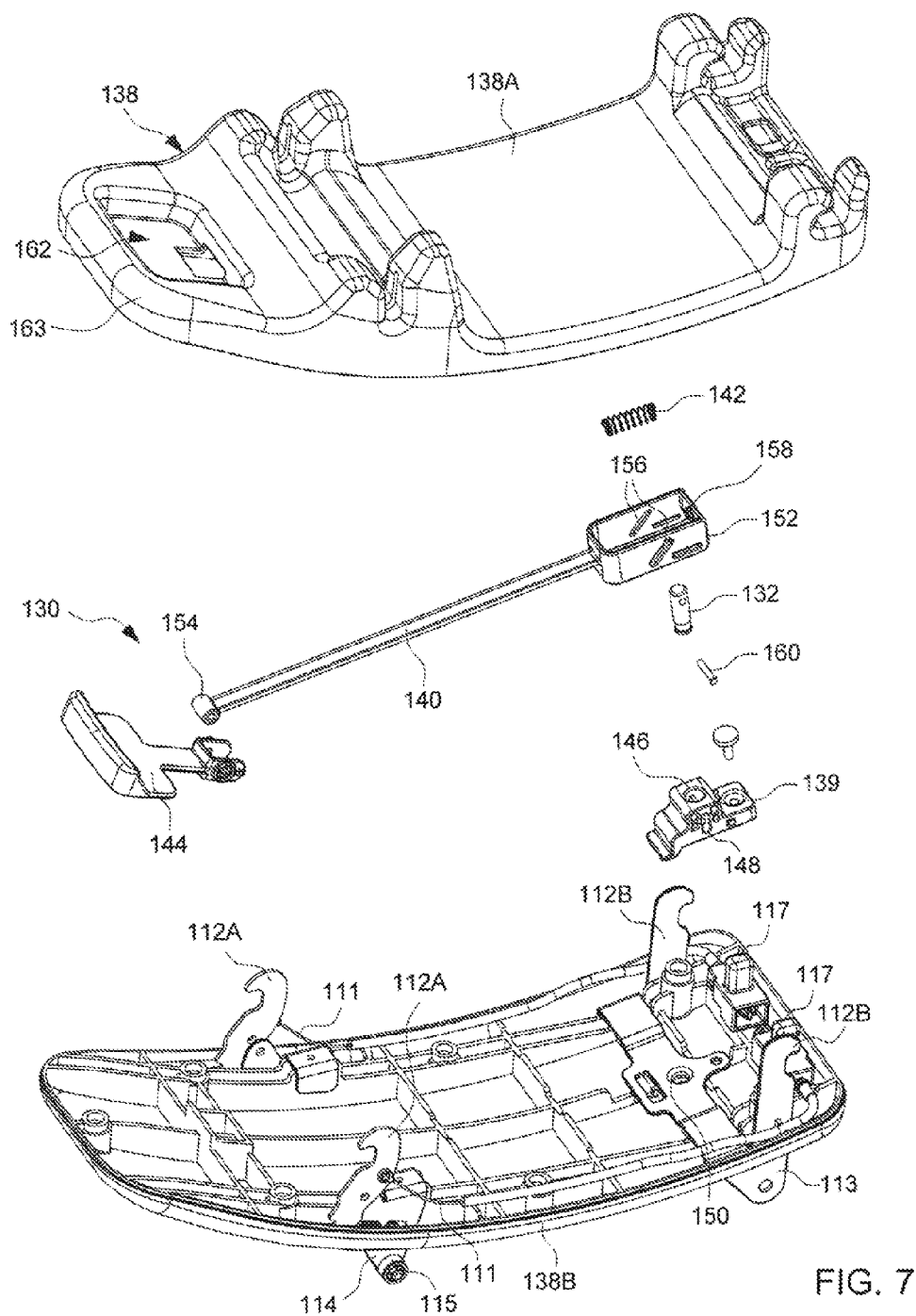
FIG. 7 is an exploded view illustrating a portion of a latch mechanism arranged in the platform of the base.
Figure 8:
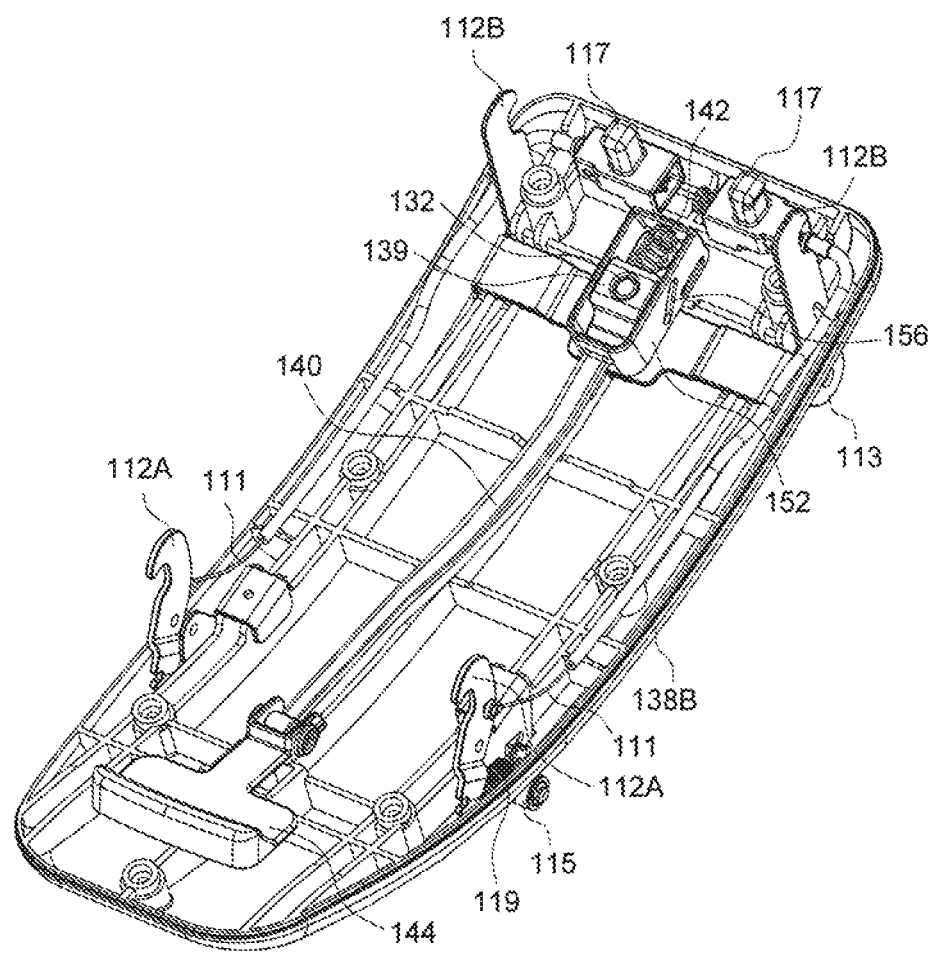
FIG. 8 is a schematic view illustrating a construction of the latch mechanism arranged in the platform of the base.

As better shown in FIGS. 7 and 8, the fasteners 112A can be pivotally assembled with the platform 108, and the fasteners 112B can be affixed with the platform 108. The fasteners 112A can be operatively connected with two actuators 117 via two transmission members 111, respectively. The transmission members 111 can be exemplary cables, and the actuators 117 can be disposed near a rear of the platform 108. The actuators 117 can move transversally toward each other to pull on the transmission members 111, which cause the fasteners 112A to rotate and disengage from the seat portion 102. Springs 119 can bias the fasteners 112A to recover a locking state for engaging with the seat portion 102.

Figure 3:
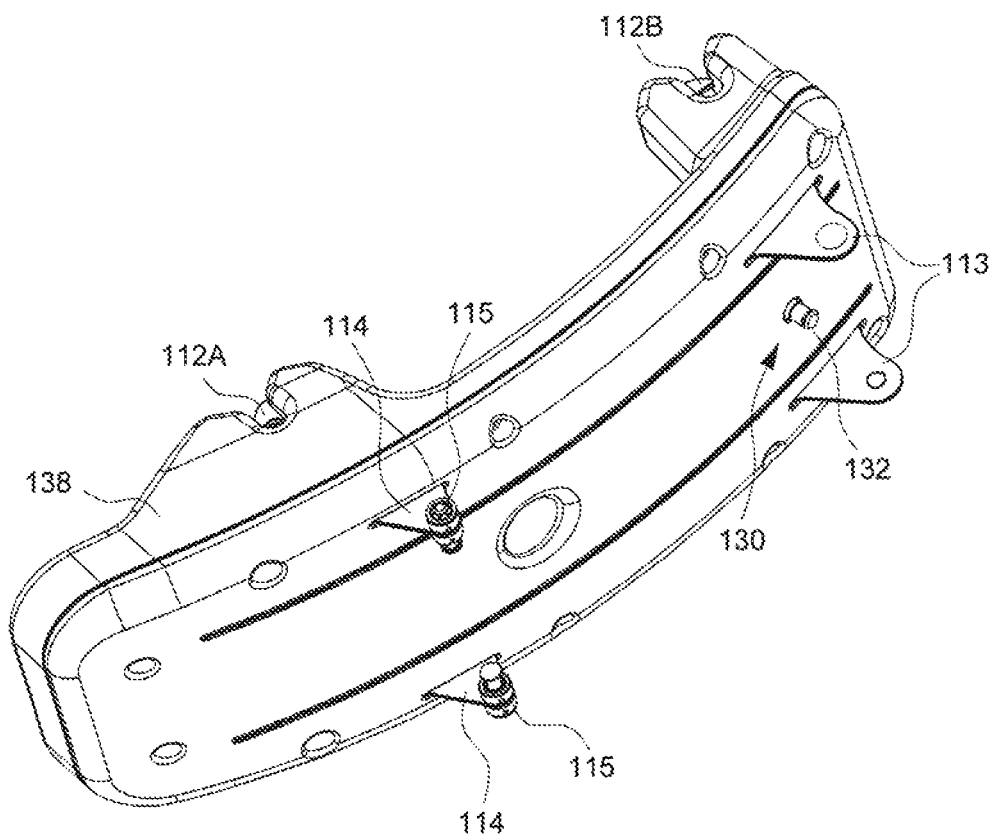
FIG. 3 is a schematic view illustrating a bottom of a platform of the child safety carrier.
Figure 4:
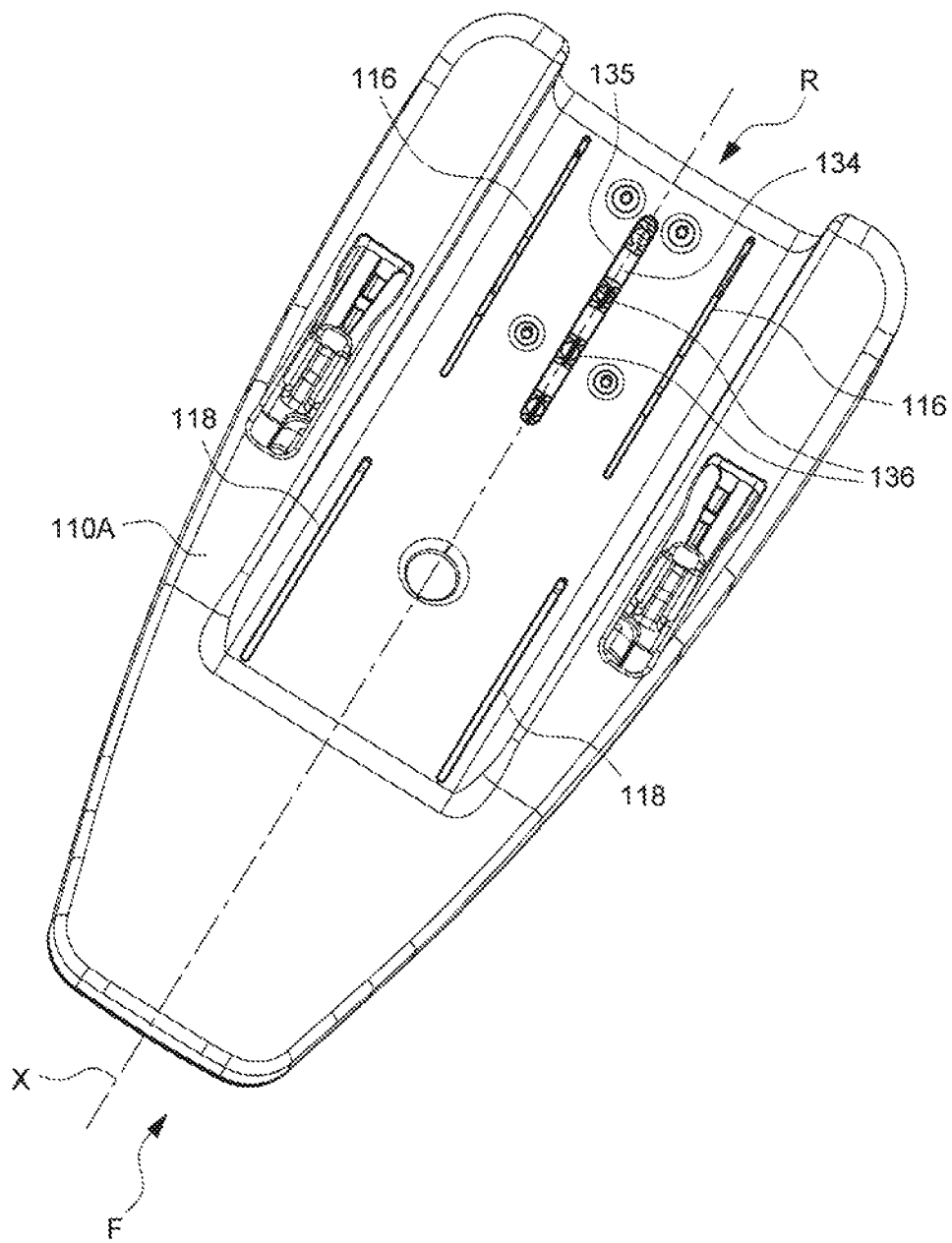
FIG. 4 is a schematic view illustrating an upper side of a shell body of the base.
Figure 5:
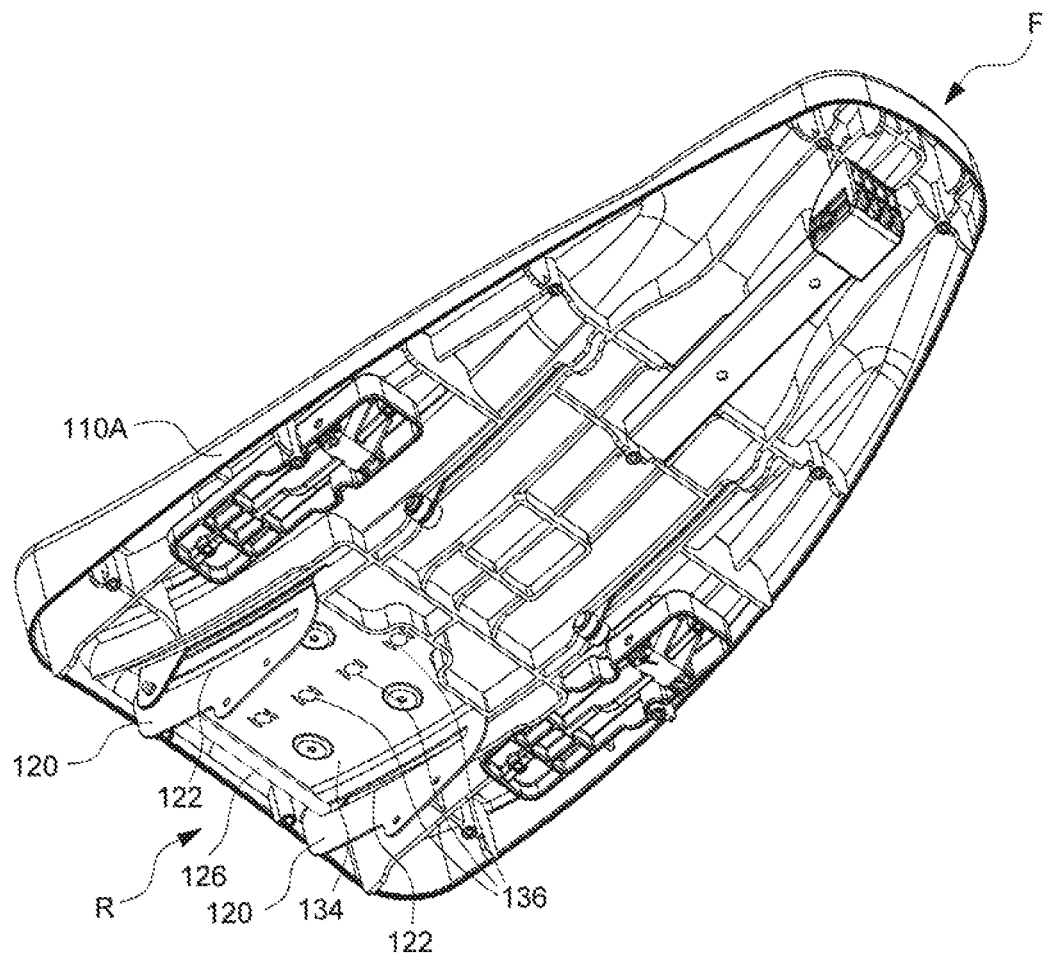
FIGS. 5 and 6 are schematic views illustrating how the platform is assembled with an upper and a lower shell portion of the base.
Figure 6:
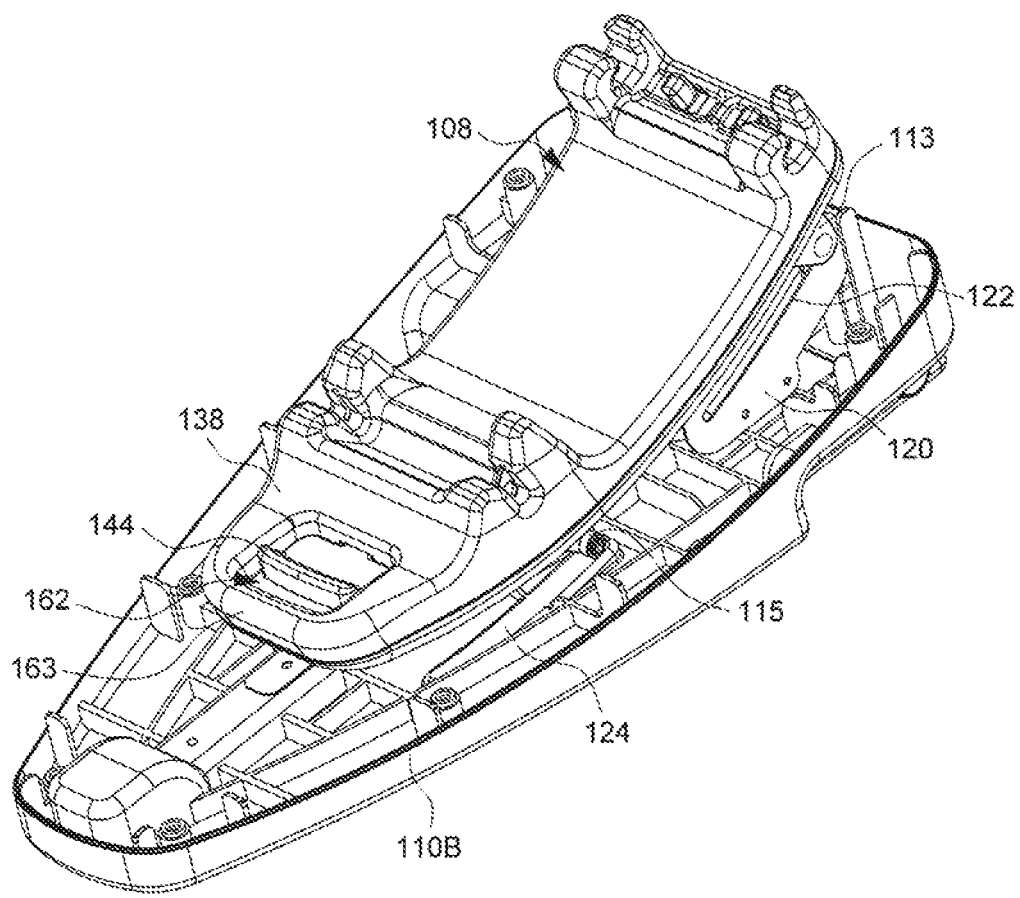

FIG. 3 is a schematic view illustrating a bottom of the platform 108, FIG. 4 is a schematic view illustrating an upper side of the shell body 110, and FIGS. 5 and 6 are schematic views illustrating how the platform 108 is assembled with the upper shell portion 110A and the lower shell portion 110B. Referring to FIGS. 3-6, the platform 108 can have a lower surface provided with spaced-apart ribs 113 and 114 that are disposed along the lengthwise axis X. The two ribs 113 are transversally spaced apart from each other, and are arranged near the rear of the platform 108. The two ribs 114 are also transversally spaced apart from each other and are disposed in front of the ribs 113. Moreover, the ribs 114 can have distal ends provided with rollers 115.

The upper shell portion 110A can include a plurality of elongated slots 116 and 118 respectively corresponding to the ribs 113 and 114. Moreover, a bottom of the upper shell portion 110A can be affixed with symmetric brackets 120 disposed adjacent to the inner side of the elongated slots 116. Each of the brackets 120 can include a guide slot 122. The lower shell portion 110B can include contact surfaces 124 respectively corresponding to the ribs 114.

When the platform 108 is assembled with the base 104, the ribs 113 and 114 can be respectively arranged through the elongated slots 116 and 118, and the rollers 115 can respectively contact with the contact surfaces 124. Moreover, the ribs 113 can be respectively connected with a transversal rod 126 that is disposed between the ribs 113 and respectively pass through the guide slots 122 of the brackets 120. When the platform 108 is adjusted forward or rearward relative to the shell body 110 of the base 104, the rod 126 can slide along the guide slots 122 and the rollers 115 can roll along the contact surfaces 124.

For locking the platform 108 in position, a latch mechanism 130 can be arranged between the base 104 and the platform 108. In one embodiment, the latch mechanism 130 can include a latch 132 and a holding frame 134. The latch 132 can be assembled with the platform 108, and can be movable along a slot 135 that is formed through an upper surface of the shell body 110 and extends along the lengthwise axis X. In one embodiment, the latch 132 can exemplary have a post.

The holding frame 134 can be affixed in an interior of the shell body 110 near the rear of the base 104. The holding frame 134 can include a plurality of locking openings 136 spaced apart from one another along the lengthwise axis X. The locking openings 136 can be distributed along the slot 135 and can communicate with the slot 135. The latch 132 can protrude downward from the bottom surface of the platform 108, and can slide up and down relative to the platform 108 and the shell body 110 to engage and disengage any of the locking openings 136 for locking and unlocking the platform 108 on the shell body 110.

Figure 9:
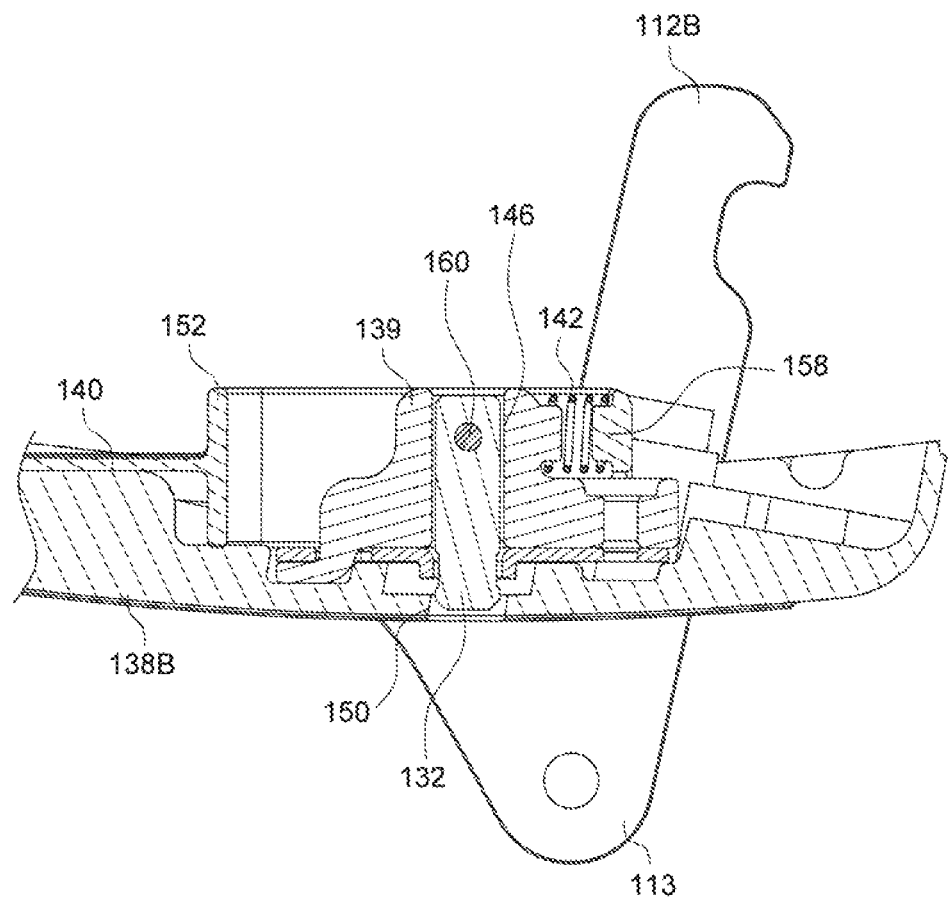
FIG. 9 is a cross-sectional view of the latch mechanism.

FIGS. 7, 8 and 9 are respectively exploded, inner perspective and cross-sectional views illustrating the construction of the latch mechanism 130 in the platform 108. The latch mechanism 130 can be respectively assembled with the platform 108 and the shell body 110 of the base 104. The platform 108 can include a casing body 138 formed by the assembly of an upper casing 138A and a lower casing 138B. The latch mechanism 130 can further include a fixed frame 139, a driving member 140, a spring 142 and a release actuator 144 that are respectively disposed in the casing body 138.

The fixed frame 139 can be affixed with the casing body 138 of the platform 108, and can include a hole 146 and two side slots 148. The hole 146 can correspond with an opening 150 of the lower casing 138B, and the two side slots 148 can be respectively arranged at a left and a right side of the hole 146.

The driving member 140 can have an elongated shape extending along the lengthwise axis X, and can have two opposite ends respectively connected with the latch 132 and the release actuator 144. A rear end portion of the driving member 140 can form a driving frame 152, and a front end portion of the driving member 140 can form a pivot pin 154. The driving frame 152 can have a left and a right sidewall respectively provided with symmetric driving slots 156, and a rear sidewall provided with a protrusion 158 projecting forward. When the fixed frame 139, the driving member 140 and the latch 132 are assembled in the casing body 138, the fixed frame 139 is positioned in the driving frame 152, the latch 132 is placed in the hole 146 of the fixed frame 139, and a pin 160 respectively passes through the side slots 148 of the fixed frame 139, the driving slots 156 of the driving frame 152 and the latch 132. Moreover, the driving slots 156 can be respectively inclined an angle relative to the side slots 148, and can extend along an inclined direction intersecting a vertical direction. Accordingly, a displacement of the driving member 140 along the lengthwise axis X can drive the latch 132 to slide up and down along the hole 146 of the fixed frame 139 for engaging and disengaging the holding frame 134.

The spring 142 can be disposed between the protrusion 158 of the driving frame 152 and the fixed frame 139. The spring 142 can urge the driving member 140 to move rearward along the lengthwise axis X. Owing to the sliding connection of the pin 160 through the side slots 148 and the driving slots 156, this rearward displacement of the driving member 140 can cause the latch 132 to slide downward through the opening 150 and extend outward from the bottom surface of the casing body 138 to engage with the holding frame 134. The platform 108 can be thereby locked with the shell body 110 of the base 104.

The release actuator 144 can be arranged in a central region at the front of the platform 108 (i.e., opposite to the connectors 106), and can be pivotally connected with the pivot pin 154 of the driving member 140. The release actuator 144 and the driving member 140 can be operable and movable along the same lengthwise axis X. In one embodiment, an opening 162 can be formed through an upper surface of the casing body 138 at a central region of its front portion. The opening 162 can extend from the upper surface to the lower surface of the platform 108 so as to form a handle 163 in the platform 108. The release actuator 144 can be exposed through the opening 162 so as to be accessible from an outside of the platform 108 (e.g., from the upper side of the platform 108), and can be located adjacent to the handle 163. Accordingly, a caregiver can grasp the handle 163 and operate the release actuator 144 at the same time to unlock and displace the platform 108, which allows convenient adjustment of the platform 108.

Figure 10:
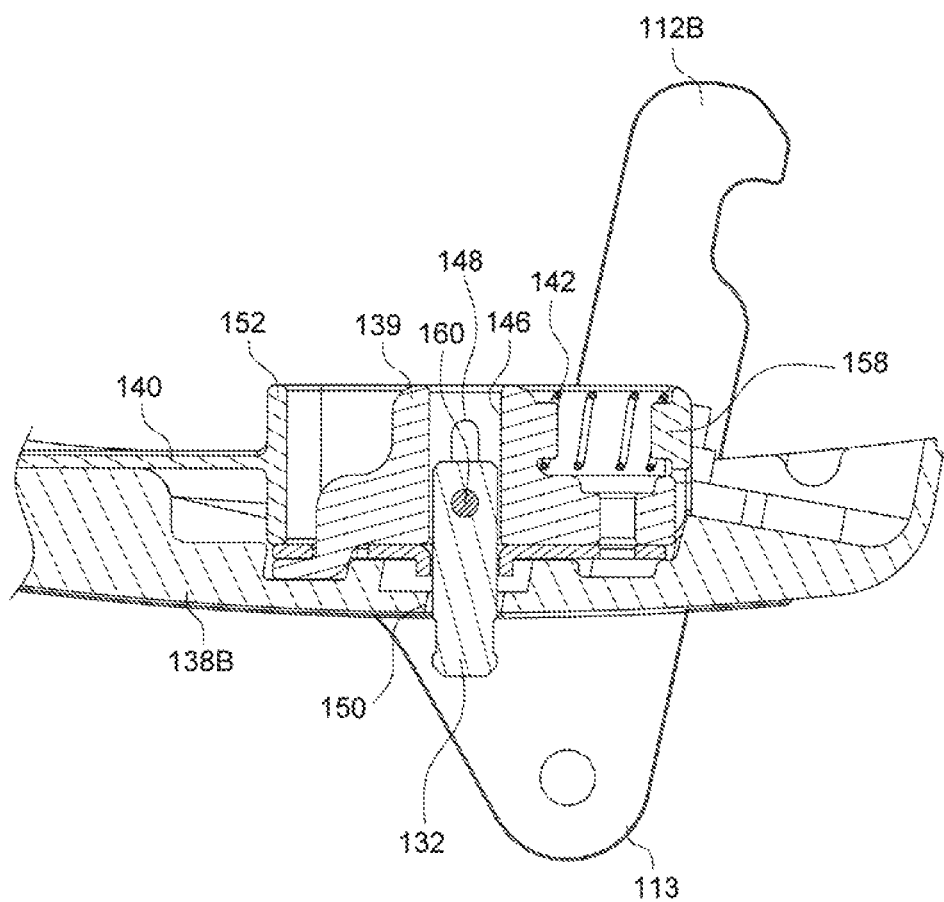
FIG. 10 is a schematic view illustrating an operation of the latch mechanism.

Referring to FIG. 10, when the release actuator 144 is displaced forward, the driving member 140 can be urged to move forward and compress the spring 142. Owing to the sliding connection of the pin 160 through the side slots 148 and the driving slots 156, the forward displacement of the driving member 140 can drive the latch 132 to slide upward relative to the platform 108 and disengage from the holding frame 134. The platform 108 can be thereby unlocked for adjustment. The caregiver then can move the platform 108 and the seat portion 102 forward or downward to a desired position. When the platform 108 moves relative to the shell body 110, the latch 132, the driving member 140 and the release actuator 144 can move in unison relative to the holding frame 134. Once the platform 108 has reached a desired position, the spring 142 can urge the driving member 140 to move rearward, which causes the latch 132 to slide downward and engage with one locking opening 136 of the holding frame 134. The platform 108 and the seat portion 102 can be thereby locked in position. With the latch mechanism 130, multiple adjustment positions can be provided for the seat portion 102.

Figure 11:
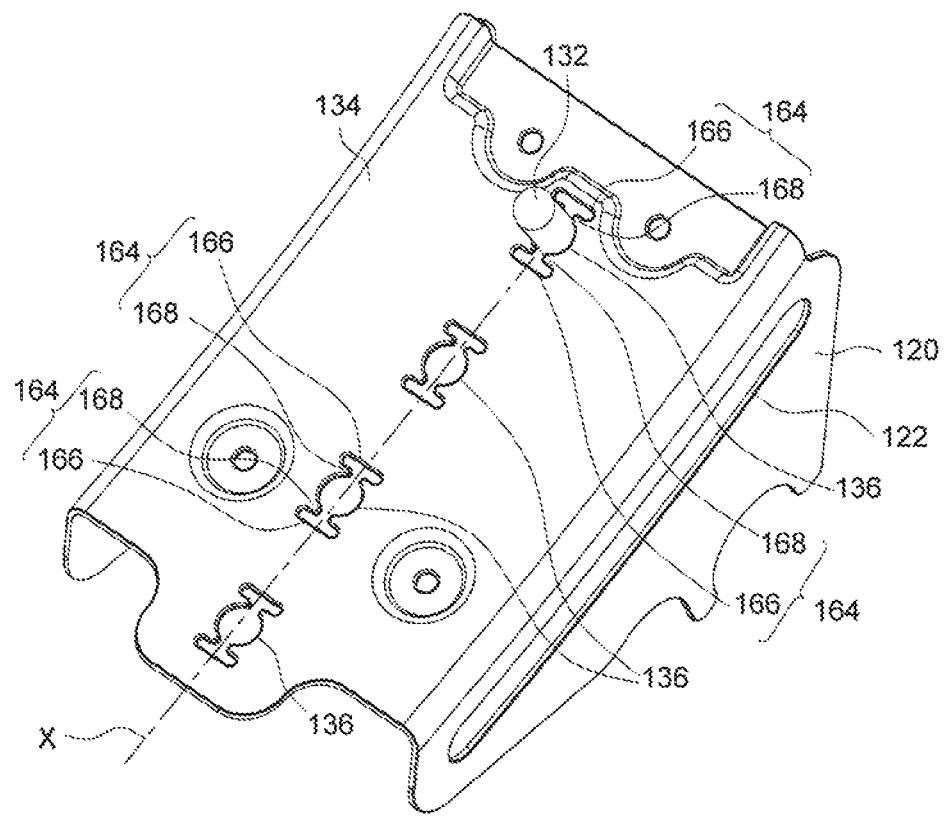
FIG. 11 is a schematic view illustrating a holding frame of the latch mechanism provided with cushion structures.

FIG. 11 is a schematic view illustrating the holding frame 134 in more details. The holding frame 134 can be exemplary made of steel or like rigid metal, and can be affixed in the shell body 110 of the base 104. In one embodiment, the holding frame 134 can be formed integrally with the brackets 120. The locking openings 136 can be spaced apart from one another, and can be disposed in a row along the lengthwise axis X at a central region of the holding frame 134. Each of the locking openings 136 can be associated with a different position of the platform 108, and the latch 132 can engage with any of the locking openings 136 to lock the platform 108 in place.

Moreover, the platform 108 can include a plurality of cushion structures 164 disposed adjacent to each locking opening 136. Assume that the child safety carrier 100 is used to seat a child in a vehicle and the latch 132 engages with one locking opening 136. In case collision occurs, the latch 132 can interact with one cushion structure 164, which causes the cushion structure 164 to deform or break so as to create a cushioning displacement of the seat portion 102 and the platform 108 relative to the shell body 110 of the base 104.

In the embodiment of FIG. 11, two cushion structures 164 can be respectively disposed adjacent to two opposite sides of each locking opening 136 along the lengthwise axis X. The distance between each locking opening 136 and one cushion structure 164 adjacent thereto is smaller than the distance between two successive locking openings 136. Each cushion structure 164 can include a slit 166 and ribs 168 formed in the holding frame 134. The slit 166 can be arranged adjacent to one side of the locking opening 136, and can communicate with the locking opening 136. In each cushion structure 164, the ribs 168 can be arranged between the slit 166 and the locking opening 136. In one embodiment, the ribs 168 can be formed integrally with the holding frame 134 from the same material. Because each of the ribs 168 has a width that is smaller than the distance between two successive locking openings 136, each cushion structure 164 has a higher ability to deform compared to the material thickness between two successive locking openings 136.

Figure 12:
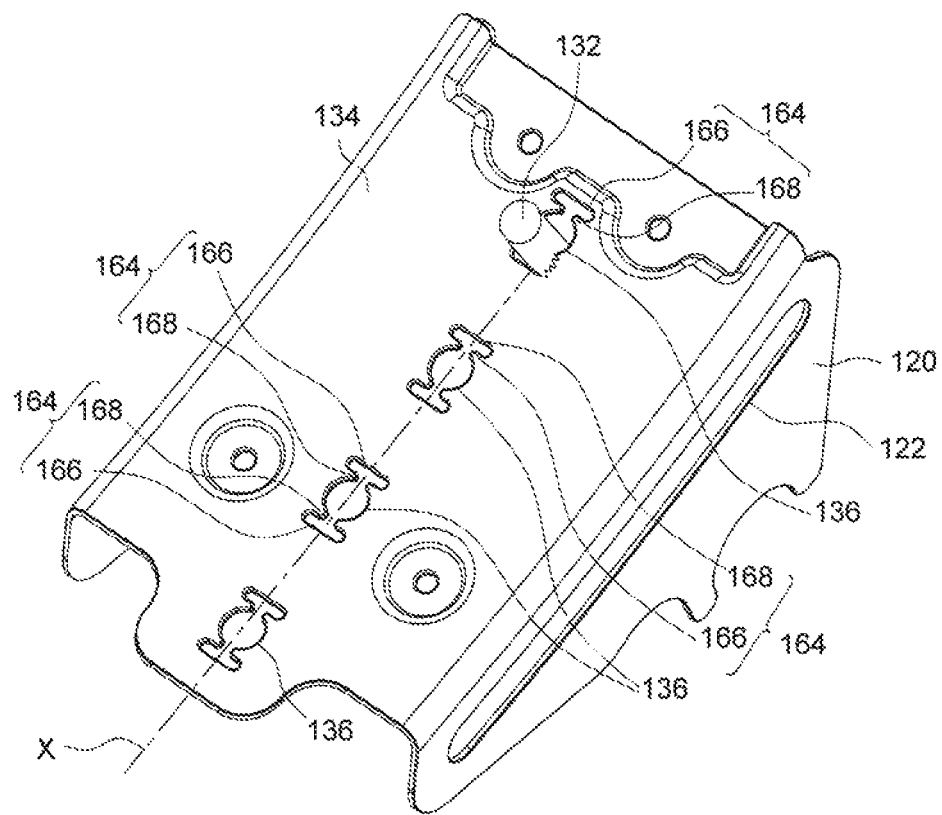
FIG. 12 is a schematic view illustrating a cushioning action of the cushion structures shown in FIG. 11.

Referring to FIG. 12, when the vehicle is subject to forward or rearward collision, the seat portion 102 and the platform 108 can displace relative to the shell body 110 of the base 104, and the latch 132 can move toward one slit 166 and breaks or causes deformation of the ribs 168. As a result, the cushion structure 164 can absorb a part of the collision energy, and reduce the risk of child's injury.

Figure 13:
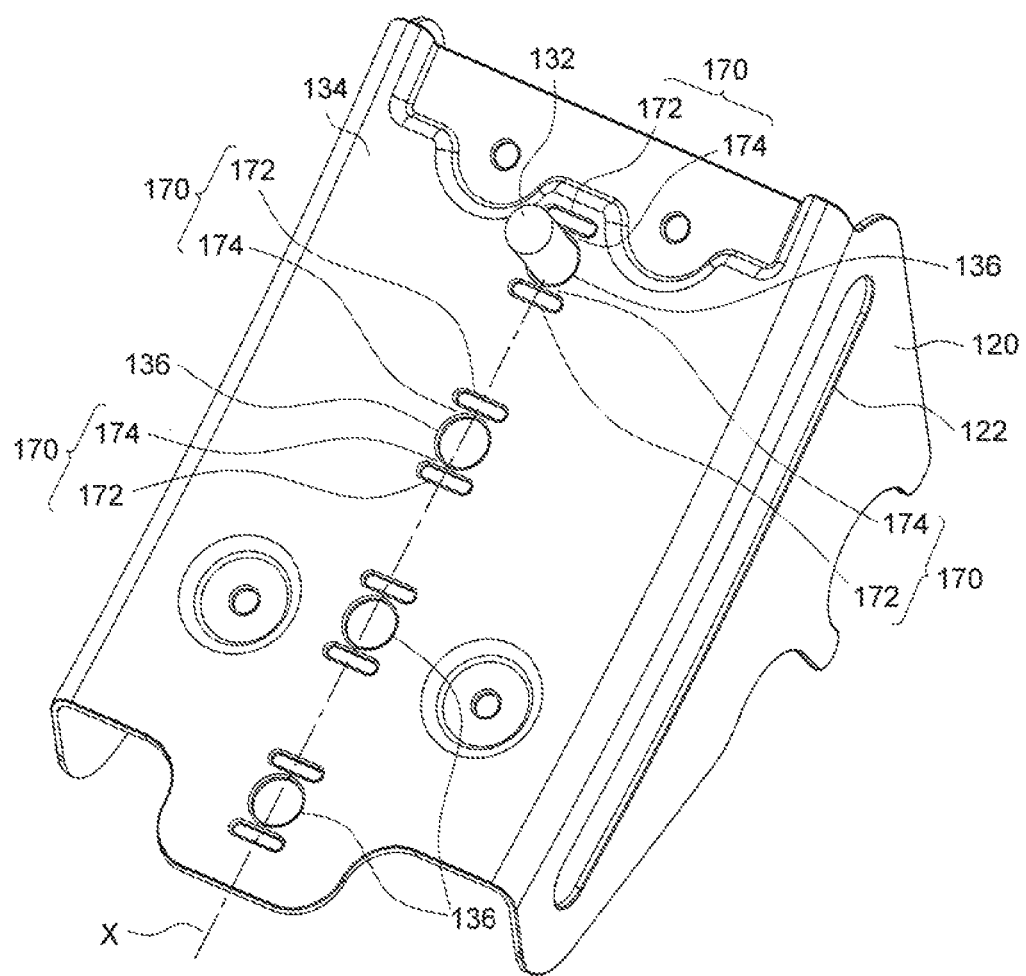
FIG. 13 is a schematic view illustrating another embodiment of cushion structures provided in the latch mechanism.
Figure 14:
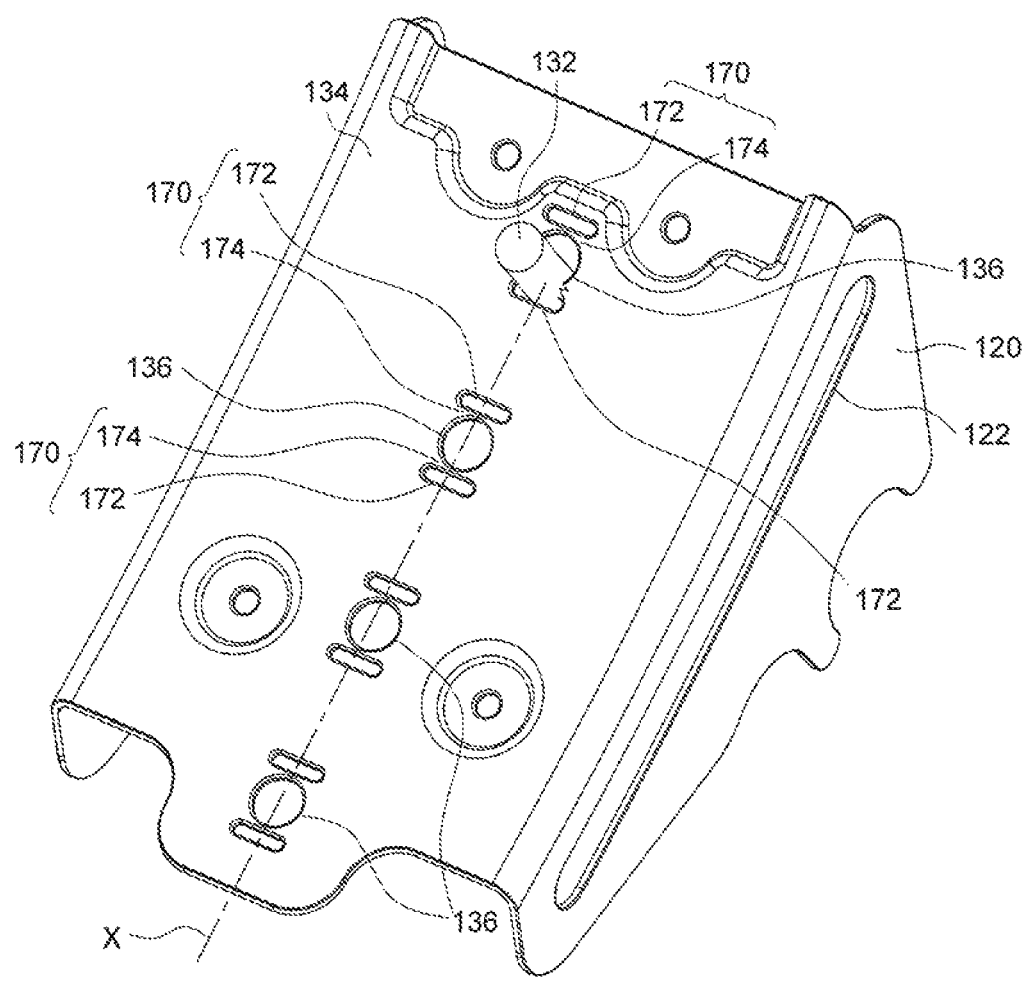
FIG. 14 is a schematic view illustrating a cushioning action of the cushion structures shown in FIG. 13.

FIGS. 13 and 14 are schematic views illustrating another embodiment of a cushion structure 170 provided in the holding frame 134. Like previously described, two cushion structures 170 can be respectively disposed adjacent to two opposite sides of each locking opening 136 along the lengthwise axis X. Each cushion structure 170 can include a slit 172 and a rib 174. The slit 172 can be arranged adjacent to one side of the locking opening 136, and can be disconnected from the locking opening 136. In each cushion structure 164, the rib 174 can be interposed between the slit 172 and the locking opening 136, and can entirely isolate the slit 172 from the locking opening 136 such that the slit 172 and the locking opening 136 do not communicate with each other. In one embodiment, the rib 174 can be formed integrally with the holding frame 134 from the same material. Because each rib 174 has a width that is smaller than the distance between two successive locking openings 136, each cushion structure 170 has a higher ability to deform compared to the material thickness between two successive locking openings 136.

Referring to FIG. 14, when the vehicle is subject to forward or rearward collision, the seat portion 102 and the platform 108 can displace relative to the shell body 110 of the base 104, and the latch 132 can move toward one slit 172 and breaks the adjacent rib 174. As a result, the cushion structure 170 can absorb a part of the collision energy.

Figure 15:
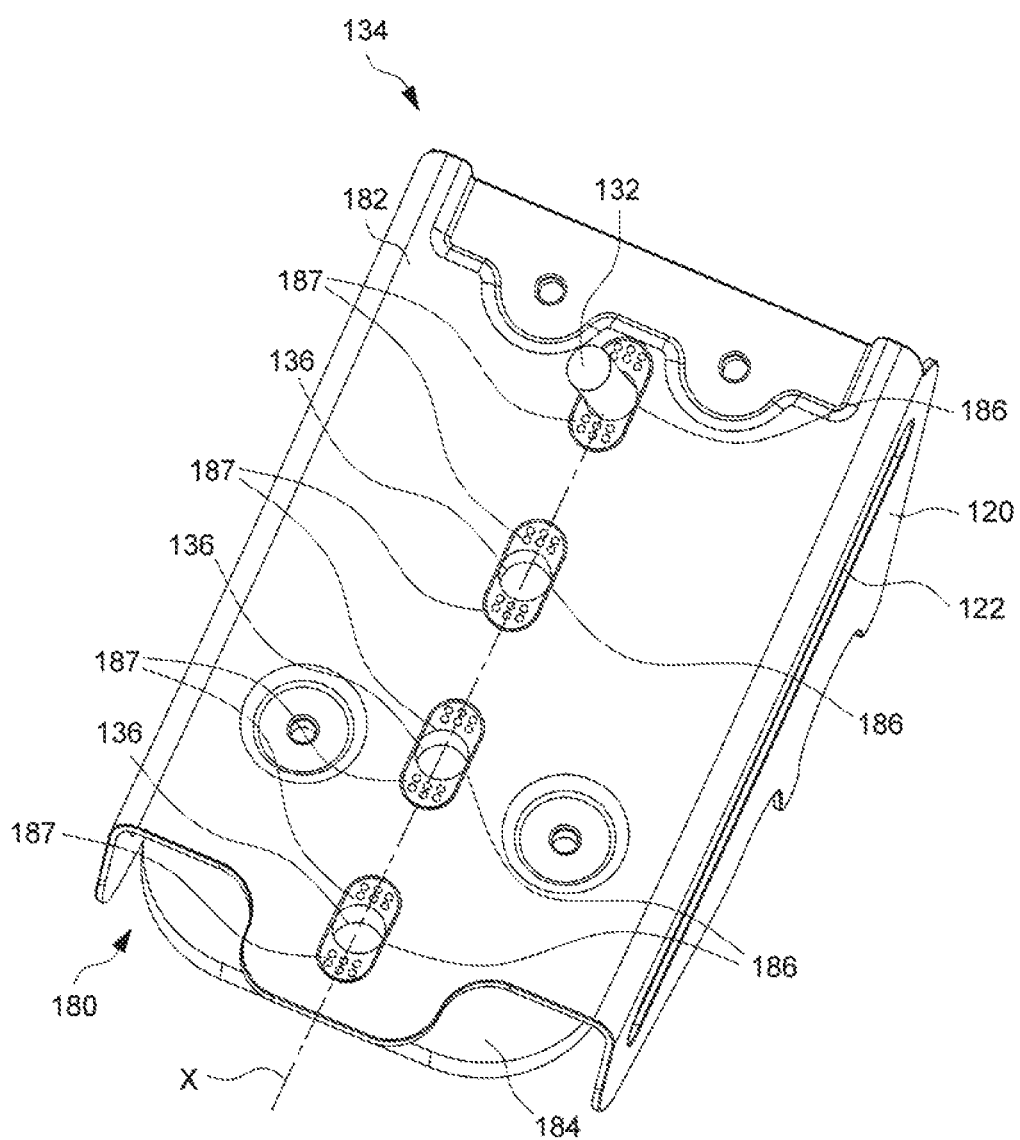
FIG. 15 is a schematic view illustrating another embodiment of the holding frame used in the latch mechanism.
Figure 16:
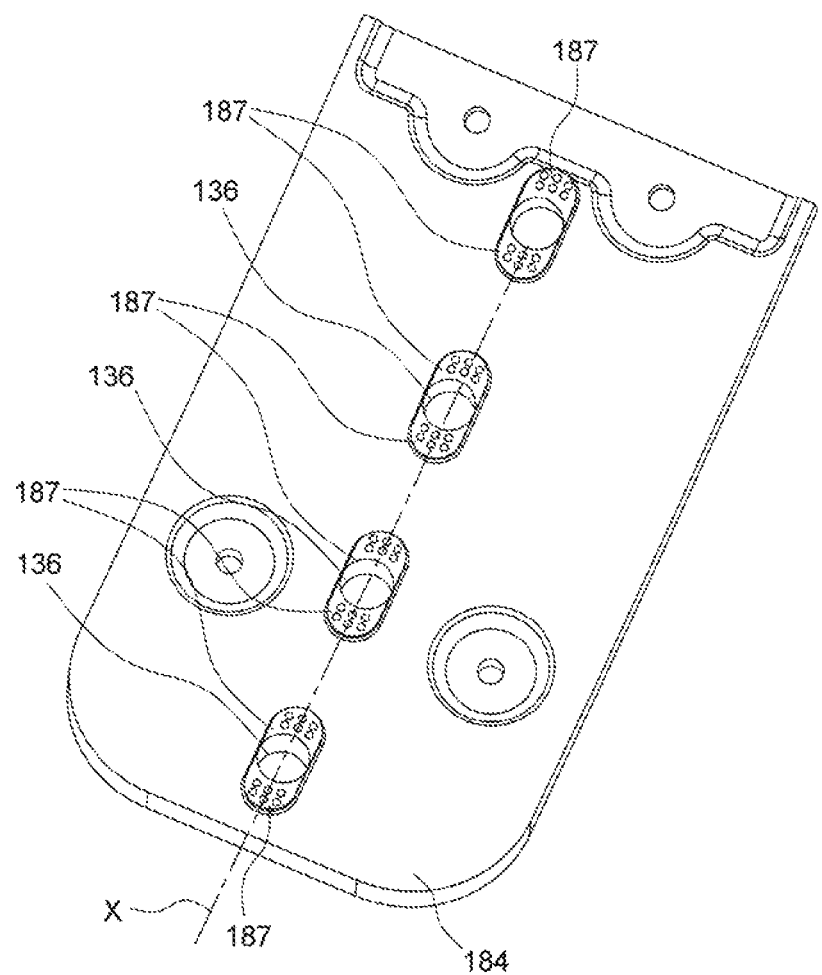
FIG. 16 is a schematic view illustrating cushion structures provided in the holding frame shown in FIG. 15.
Figure 17:
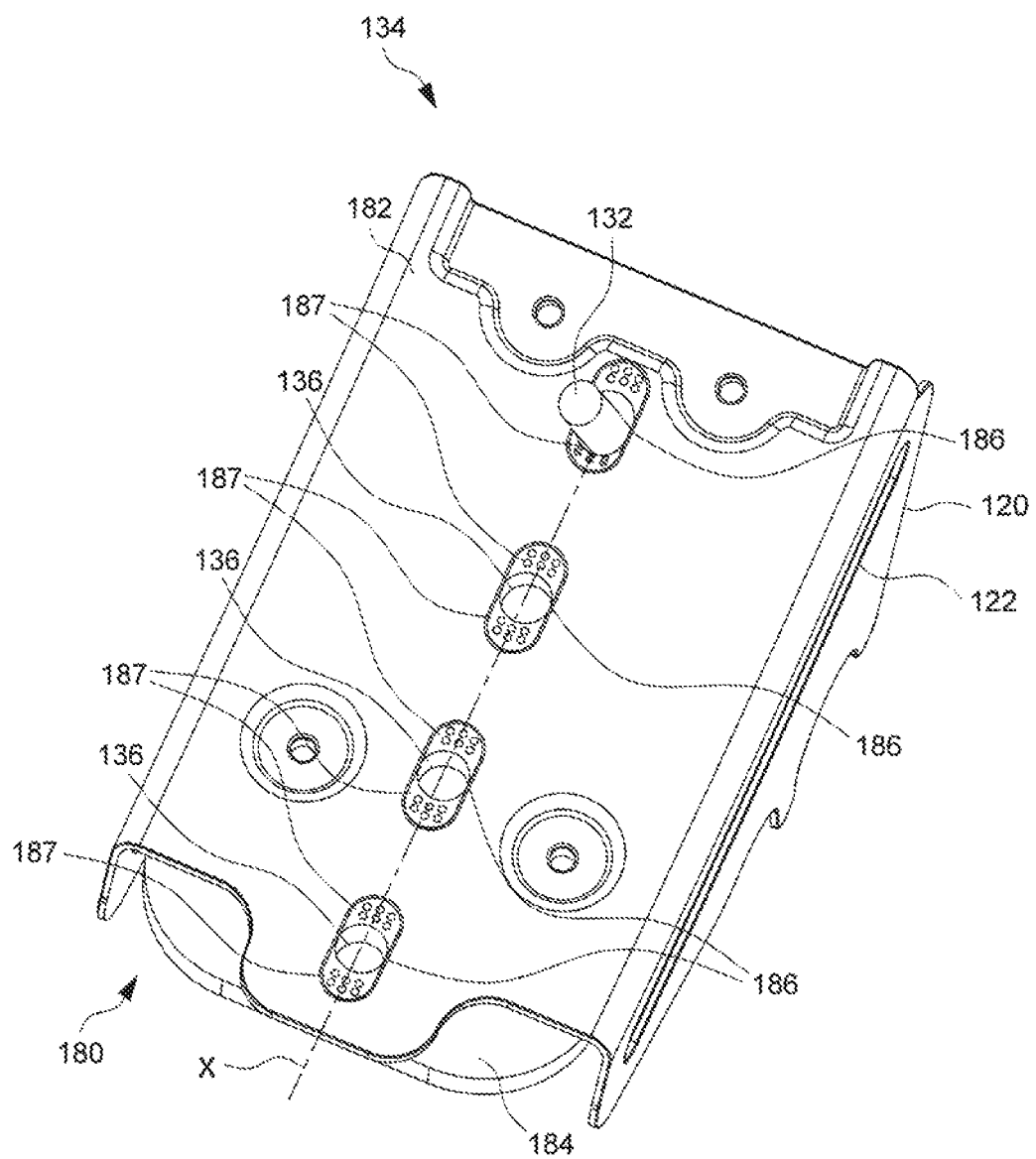
FIG. 17 is a schematic view illustrating a cushioning action of the cushion structures shown in FIG. 16.

FIGS. 15-17 are schematic views illustrating another embodiment of a cushion structure 180 provided in the holding frame 134. In this embodiment, the holding frame 134 can be formed by the assembly of two plates 182 and 184 affixed on each other. The plate 182 can be exemplary made of steel or like rigid metal materials. The plate 182 can include a plurality of elongated slots 186 spaced apart from one another along the lengthwise axis X. The plate 184 can be exemplary made of a plastic material. The locking openings 136 can be formed through the plate 184 along the lengthwise axis X. Two cushioning regions 187 can be respectively disposed adjacent to two opposite sides of each locking opening 136 along the lengthwise axis X. Each cushioning region 187 can be made of the same material as the plate 184, and can include a plurality of perforations so that the cushioning region 187 has a higher ability to deform compared to the material thickness between two successive locking openings 136. When the plates 182 and 184 are affixed with each other, each locking opening 136 and the cushioning regions 187 adjacent thereto are substantially aligned with and located within one corresponding elongated slot 186. The construction of the plate 184, in particular the cushioning regions 187, can form the cushion structures 180.

Referring to FIG. 15, the latch 132 can travel through any elongated slot 186 of the plate 182 to engage with one corresponding locking opening 136 of the plate 184 to lock the platform 108 and the seat portion 102 in position.

Referring to FIG. 17, when the vehicle is subject to forward or rearward collision, the seat portion 102 and the platform 108 can displace relative to the shell body 110 of the base 104, and the latch 132 can move toward one cushioning region 187, which causes compression of the cushioning region 187. The cushioning region 187 is thereby deformed or broken to absorb a part of the collision energy. When one or more of the cushioning regions 187 are broken, the plate 184 can be detached from the plate 182, and a new plate 184 can be attached with the plate 182. Accordingly, the cushioning structure 180 can be easily replaceable.

It is worth noting that various modifications can be made to the aforementioned embodiments. For example, the latch 132, the fixed frame 139, the driving member 140, the spring 142 and the release actuator 144 can be arranged in the shell body 110 of the base 104, whereas the holding frame 134 and the cushion structures can be arranged in the platform 108. In other words, the effects and advantages described herein can be provided by arranging the latch 132, the fixed frame 139, the driving member 140, the spring 142 and the release actuator 144 in either of the shell body 110 and the platform 108, and the holding frame 134 and the cushion structures in the other one of the shell body 110 and the platform 108.

Figure 18:
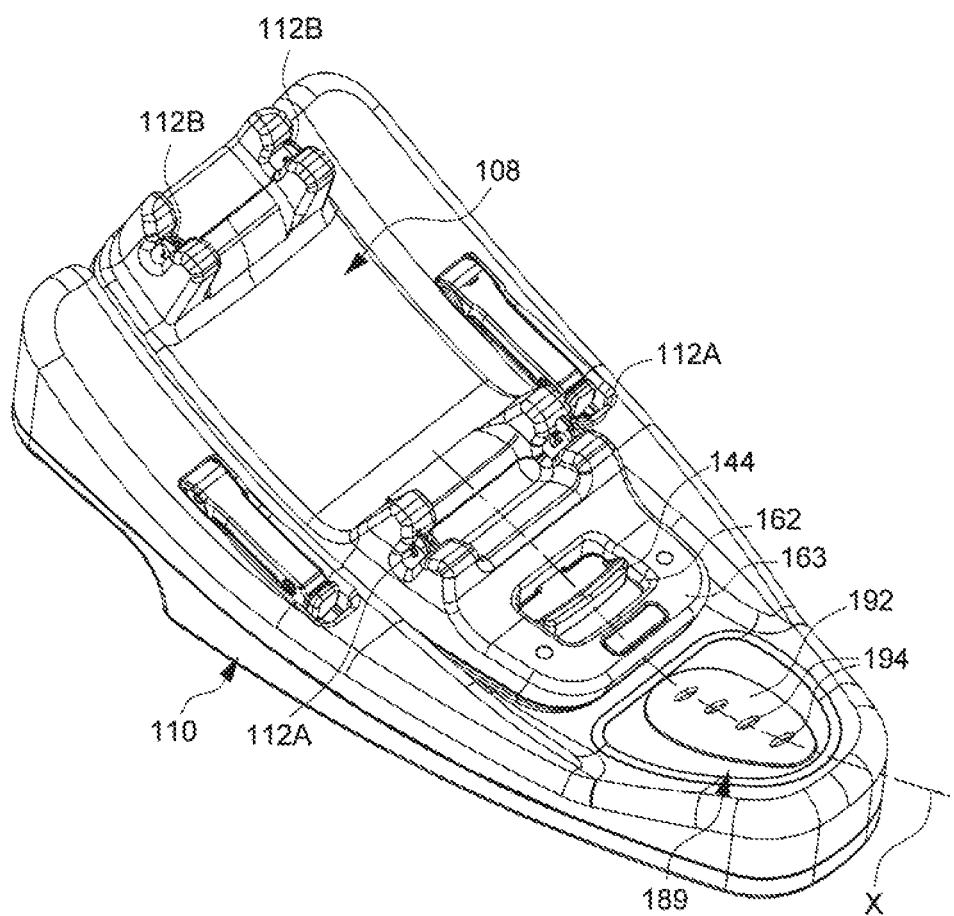
FIG. 18 is a schematic view illustrating another embodiment of a child safety carrier provided with a position indicator mechanism.
Figure 19:
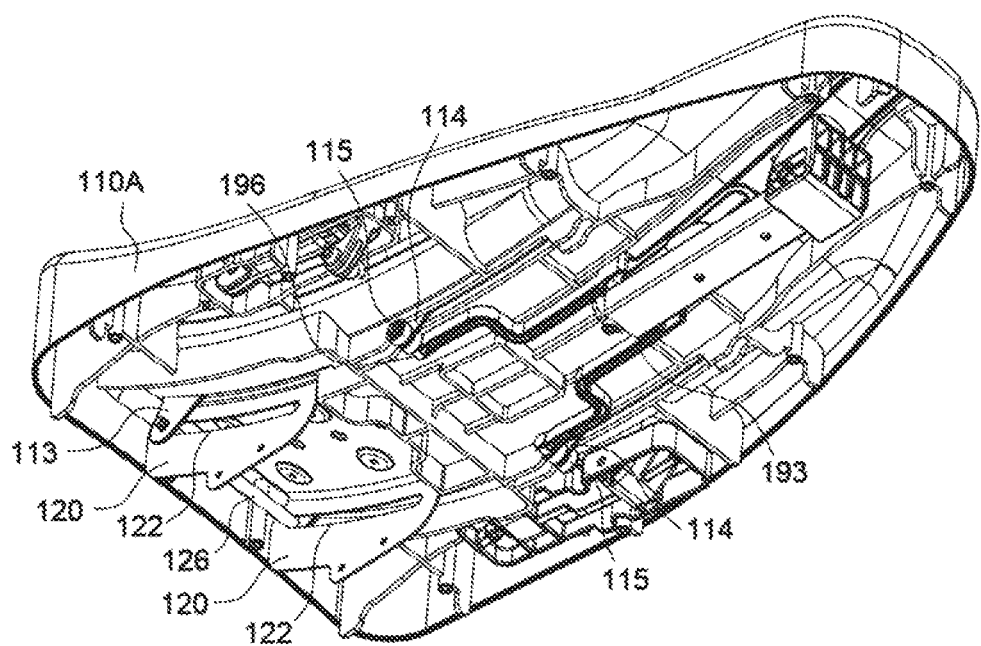
FIGS. 19 and 20 are schematic views illustrating the construction of the position indicator mechanism.
Figure 20:
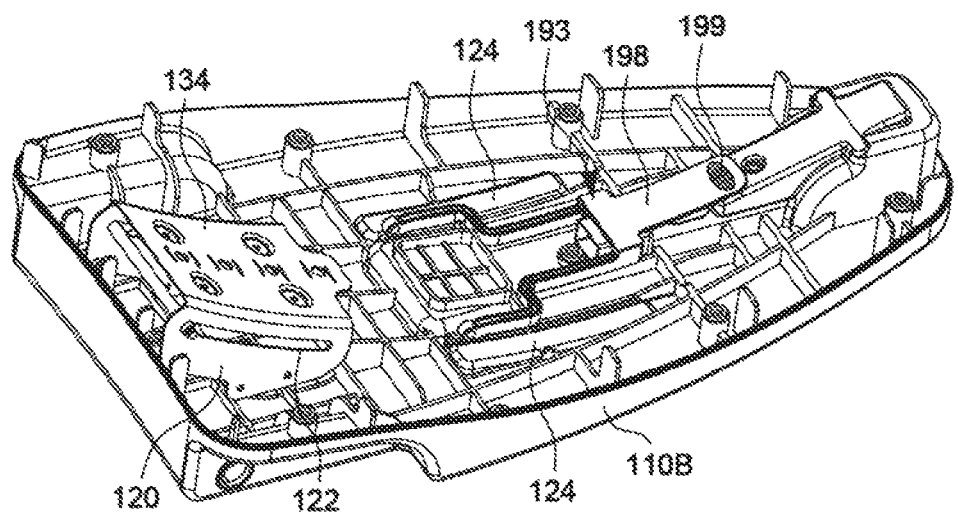

In order to easily determine the current position of the seat portion 102, the child safety carrier 100 can further include a position indicator mechanism. FIG. 18 is a perspective view illustrating another embodiment of the child safety carrier 100 provided with a position indicator mechanism 189, and FIGS. 19 and 20 are schematic views illustrating the construction of the position indicator mechanism 189. The position indicator mechanism 189 can include an outer casing portion 192 and a movable member 193. The outer casing portion 192 can be disposed at an upper surface of the shell body 110 near its front, and can include a plurality of display openings 194 spaced apart from one another along the lengthwise axis X. In one embodiment, the display openings 194 and the release actuator 144 can be substantially aligned with the lengthwise axis X, so that a caregiver can operate the platform 108 and view its current location on the position indicator mechanism 189.

The movable member 193 can be operatively connected with the platform 108. The movable member 193 can have a pivot connecting portion 196 and an extension 198. The extension 198 can have an indicator region 199 that can be aligned with any of the display openings 194. When the movable member 193 is assembled in the shell body 110, the pivot connecting portion 196 can be pivotally connected with the ribs 114 of the platform 108, and the indicator region 199 can be aligned with any of the display openings 194 to indicate a corresponding position of the platform 108. During adjustment of the seat portion 102, the platform 108 and the movable member 193 can be displaced in unison so that the indicator region 199 can be exposed through any of the display openings 194 to indicate a position of the seat portion 102.

The child safety carrier as described herein can include a movable platform that is operable to adjust a position and inclination of the seat portion relative to the base. Moreover, a latch mechanism used to lock the platform in position can include cushion structures that can absorb a part of the collision energy created when car collision occurs. The risk of injury due to concentration of the collision energy onto the child's body can be thereby reduced.

Realizations of the child safety carrier and base have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A base suitable for use with a child safety carrier, comprising:
   a shell body;
   a platform movably assembled with the shell body;
   a latch mechanism assembled with the shell body and the platform and including a holding frame and a latch, the holding frame being affixed with one among the shell body and the platform, and the latch being assembled with the other one among the shell body and the platform, wherein the holding frame includes a plurality of locking openings, and the latch is operable to engage with any of the locking openings to lock the platform with the shell body; and
   a plurality of cushion structures respectively disposed adjacent to the locking openings;
   wherein when collision occurs, the latch is operable to interact with one of the cushion structures to cause deformation or break of the cushion structure so that the platform is displaced relative to the shell body.

2. The base according to claim 1, wherein each of the locking openings has two sides respectively provided with two of the cushion structures.

3. The base according to claim 1, wherein at least one of the cushion structures includes a slit and a rib formed in the holding frame, the slit being adjacent to one of the locking openings, and the rib being disposed between the slit and the locking opening.

4. The base according to claim 3, wherein the slit and the locking opening adjacent thereto communicate with each other.

5. The base according to claim 3, wherein the rib entirely isolates the slit from the locking opening adjacent thereto, so that the slit and the adjacent locking opening are disconnected from each other.

6. The base according to claim 3, wherein the latch engaged with one locking opening is movable toward the adjacent slit to cause deformation or break of the rib when collision occurs.

7. The base according to claim 3, wherein the rib and the holding frame are formed integrally from a same material.

8. The base according to claim 1, wherein the locking openings are spaced apart from one another along a lengthwise axis of the base.

9. The base according to claim 1, wherein the holding frame includes a plate provided with the locking openings, and the cushion structures include cushioning regions formed in the plate respectively adjacent to the locking openings.

10. The base according to claim 9, wherein the holding frame includes a second plate, the two plates of the holding frame being affixed on each other, the second plate including a plurality of elongated slots, each of the locking openings and the cushioning regions adjacent thereto being exposed through one corresponding elongated slot.

11. The base according to claim 10, wherein the elongated slots are disposed along a lengthwise axis of the base.

12. The base according to claim 9, wherein the latch engaged with one locking opening is movable toward and compresses one adjacent cushioning region when collision occurs.

13. The base according to claim 9, wherein the cushioning region and the plate are formed integrally from a same material.

14. The base according to claim 1, wherein the holding frame is affixed in the shell body, and the latch is assembled with the platform, the latch being operable to extend from the platform to engage with any of the locking openings.

15. A base suitable for use with a child safety carrier, comprising:
   a shell body having a lengthwise axis;
   a platform assembled with the shell body, the platform being movable along the lengthwise axis; and a latch mechanism assembled with the shell body and the platform and including a holding frame and a latch, the holding frame being affixed with one among the shell body and the platform, and the latch being assembled with the other one among the shell body and the platform, wherein the holding frame includes a plurality of locking openings, and the latch is operable to slide along a substantially vertical direction relative to the shell body and the platform to engage with any of the locking openings to lock the platform with the shell body; and a plurality of cushion structures respectively disposed adjacent to the locking openings; wherein when collision occurs, the latch is operable to interact with one of the cushion structures to cause deformation or break of the cushion structure so that the platform is displaced relative to the shell body.

16. The base according to claim 15, wherein the latch mechanism includes a driving member extending along the lengthwise axis and connected with the latch, the driving member being movable along the lengthwise axis to drive vertical displacement of the latch.

17. The base according to claim 16, wherein the holding frame is affixed in the shell body, and the latch and the driving member are assembled with the platform, the latch being operable to extend from the platform to engage with any of the locking openings.

18. The base according to claim 17, wherein the latch mechanism further includes a fixed frame assembled with the platform, the fixed frame having a hole extending substantially vertical, the latch being movable along the hole.

19. The base according to claim 18, wherein the fixed frame includes a side slot extending substantially vertical and communicating with the hole, the driving member includes a driving frame having a driving slot extending at an angle relative to the side slot, a pin passing through the latch and guided for movement along the driving slot of the driving member and the side slot of the fixed frame.

20. The base according to claim 19, wherein the latch mechanism includes a spring arranged between the driving frame and the fixed frame, the spring biasing the latch to extend outward from the platform.

21. The base according to claim 16, wherein the latch mechanism further includes a release actuator, the latch and the release actuator being respectively connected with two opposite ends of the driving member.

22. The base according to claim 21, wherein the holding frame is affixed in the shell body, and the latch, the driving member and the release actuator are assembled with the platform, the release actuator being at least partially exposed outward from the platform for operation.

23. The base according to claim 21, wherein the platform includes an opening having a rim that at least partially defines a handle, the release actuator being exposed outward through the opening.

24. The base according to claim 15, further including a position indicator mechanism, the position indicator mechanism including:
an outer casing portion connected with the shell body and including a plurality of display openings spaced apart from one another along the lengthwise axis;
a movable member connected with the platform and having an indicator region exposable through any of the display openings to indicate a current position of the platform relative to the shell body.

25. The base according to claim 24, wherein the display openings are arranged near a front of the shell body.

26. The base according to claim 15, wherein the latch is assembled with the platform, the holding frame is affixed with the shell body near a rear thereof.

* * * * *